March 2, 1943.        E. A. CAMBURN        2,312,955
QUICK ADJUSTABLE CLAMP
Filed April 24, 1941
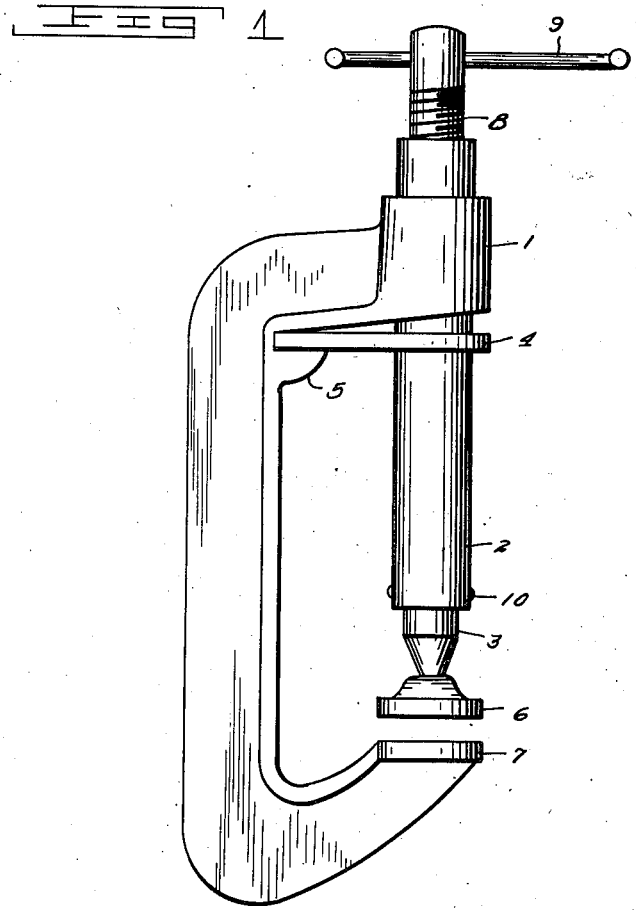
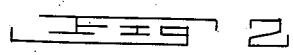
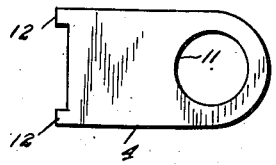
*Inventor*
Elwyn A. Camburn
By Clarence A. O'Brien
and Harvey B. Jacobson
*Attorneys*

Patented Mar. 2, 1943

2,312,955

UNITED STATES PATENT OFFICE 2,312,955

QUICK ADJUSTABLE CLAMP

Elwyn A. Camburn, Logan, Utah

Application April 24, 1941, Serial No. 390,187

1 Claim. (Cl. 144—305)

The present invention relates to new and useful improvements in clamp devices and has for its primary object to provide a C-shaped clamp embodying quick adjusting means adapted to facilitate the quick movement of one of the jaws into clamping position, and also providing a threaded stem on which the movable jaw is carried to permit the tightening of the jaw after the quick adjustment thereof has been made.

A further object is to provide a clamp device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which—

Figure 1 represents a side elevational view of the clamp in assembled position, and Figure 2 is a plan view of the locking plate or ring.

Referring now to the drawing in detail, the numeral 1 represents a tubular guide formed at one end of the C-clamp frame and in which a sleeve 2 is slidably mounted.

The stem 3 is positioned in the sleeve for longitudinal movement, the lower end of the stem having the jaw head 6 swivelly mounted thereon for engagement with the fixed jaw 7 formed on the lower end of the clamp frame, the head 6 being movable relative to the jaw 7 for clamping the work therebetween.

The sleeve 2 is secured against movement in the guide 1 by means of a locking plate or ring member 4 having an opening 11 adjacent one end in which the sleeve 2 is snugly fitted, the other edge of the ring being engaged between a shoulder 5 and the upper arm of the frame of the clamp. The end of the ring adjacent the shoulder 5 is provided with spaced lugs 12 engaging opposite edges of the frame. The ring 4 is adapted for movement toward and away from the adjacent edge of the clamp in which the guide 1 is formed, so that the ring may occupy a position inclined with respect to the axis of the sleeve, whereby to cause a binding action of the sleeve in the opening of the ring to secure the sleeve against sliding movement when the ring is in its inclined position, and permitting uninterrupted sliding movement of the sleeve when the ring is at right angles to the axis of the sleeve.

The sleeve 2 is internally threaded adjacent its upper end for threaded engagement by the threads 8 formed on the upper end of the stem 3 whereby the head or jaw 6 may be tightened against the work after the quick adjustment has been made through the manipulation of the ring 4.

The handle 9 is slidable transversely through the upper end of the stem 3 to manipulate the stem for accomplishing the threaded adjustment thereof.

Protuberances 10 on the lower end of the sleeve 2 prevent removal thereof from the guide 1.

It is believed the details of construction, operation and advantages of the device will be readily understood from the foregoing without further detailed explanation.

Having thus described the invention, what I claim is—

A clamp comprising a C-shaped frame having an arm provided with a fixed jaw at one end of the frame and an arm provided with a tubular guide at the other end of the frame, a sleeve slidably mounted in the guide, a stem having threaded adjustment in the sleeve, the lower end of the stem having a jaw adapted for movement toward and away from the fixed jaw of the frame, a locking plate having an opening aligned with the guide for slidably receiving the sleeve, a shoulder on the frame spaced from the guide supporting arm of the frame for loosely receiving one edge of the plate therebetween, said one edge of the plate being shaped to conformably receive a part of the frame to prevent movement of the plate in a direction laterally with respect to the frame, said guide supporting arm being inclined with respect to the axis of the sleeve to provide limited longitudinal movement for the plate relative to the guide to cause a binding action of the sleeve in the opening of the plate.

ELWYN A. CAMBURN.